United States Patent
Rohlf

(10) Patent No.: US 9,547,921 B1
(45) Date of Patent: Jan. 17, 2017

(54) TEXTURE FADING FOR SMOOTH LEVEL OF DETAIL TRANSITIONS IN A GRAPHICS APPLICATION

(71) Applicant: Google Inc., Mountain View, CA (US)

(72) Inventor: John H. Rohlf, Truckee, CA (US)

(73) Assignee: Google Inc., Mountain View, CA (US)

( * ) Notice: Subject to any disclaimer, the term of this patent is extended or adjusted under 35 U.S.C. 154(b) by 144 days.

(21) Appl. No.: 14/153,266

(22) Filed: Jan. 13, 2014

Related U.S. Application Data

(63) Continuation of application No. 13/412,796, filed on Mar. 6, 2012, now Pat. No. 8,654,124.

(60) Provisional application No. 61/590,546, filed on Jan. 25, 2012.

(51) Int. Cl.
*G06T 11/00* (2006.01)

(52) U.S. Cl.
CPC .... *G06T 11/001* (2013.01); *G06T 2207/20016* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 5,949,426 A | 9/1999 | Rich | |
| 6,222,555 B1 | 4/2001 | Christofferson | |
| 6,373,482 B1 | 4/2002 | Migdel | |
| 6,501,482 B1 * | 12/2002 | Rosman | G06T 3/4007 345/587 |
| 6,650,326 B1 | 11/2003 | Huber | |
| 7,027,972 B1 | 4/2006 | Lee | |
| 7,057,612 B2 | 6/2006 | Balfour | |
| 7,102,639 B2 | 9/2006 | Oka | |
| 7,551,182 B2 | 6/2009 | Bethune et al. | |
| 7,643,673 B2 | 1/2010 | Rohlf et al. | |
| 7,746,343 B1 | 6/2010 | Charaniya et al. | |
| 7,982,745 B1 | 7/2011 | Donovan | |

(Continued)

FOREIGN PATENT DOCUMENTS

| EP | 1 435 507 A2 | 7/2004 |
|---|---|---|
| WO | WO 2004/081869 A2 | 9/2004 |

OTHER PUBLICATIONS

International Search Report—4 pages.
Blow, "Unified Rendering Level-of-Detail, Part 2", The Inner Product, Apr. 2003, 4 pages.

(Continued)

*Primary Examiner* — Xiao Wu
*Assistant Examiner* — Steven Elbinger
(74) *Attorney, Agent, or Firm* — Dority & Manning, P.A.

(57) ABSTRACT

Systems and methods for providing smooth level of detail ("LOD") transition for textures in a graphics applications are disclosed. The texture LOD of a first frame of imagery can be compared to a second texture LOD for a current frame. For areas where the second LOD is higher than the first LOD, an LOD fade from the first LOD to the second LOD can be performed to provide a smooth LOD transition. The LOD fade can be implemented by generating a blend between textures at the first LOD and the second LOD. In one aspect, the blend is generated based on an interpolant value calculated based on the difference between the first LOD and the second LOD. The interpolant value can be incremented in subsequent frames to achieve a desired fade rate for the transition. The fade rate can be variable such that the LOD transition time remains constant.

15 Claims, 6 Drawing Sheets

(56) References Cited

U.S. PATENT DOCUMENTS

| | | | |
|---|---|---|---|
| 2004/0056861 A1* | 3/2004 | Huber | G06T 17/05 345/428 |
| 2004/0233219 A1* | 11/2004 | Aguera y Arcas | G06F 3/0481 345/606 |
| 2006/0267982 A1 | 11/2006 | Aguera y Arcas | |
| 2008/0273042 A1 | 11/2008 | Cai et al. | |
| 2008/0303841 A1 | 12/2008 | Newhall, Jr. | |
| 2010/0104174 A1 | 4/2010 | Rohlf et al. | |
| 2010/0201682 A1* | 8/2010 | Quan | G06K 9/00704 345/419 |
| 2011/0007094 A1 | 1/2011 | Nash et al. | |
| 2011/0205229 A1 | 8/2011 | Jagadev et al. | |
| 2011/0210960 A1 | 9/2011 | Touma et al. | |
| 2012/0038657 A1* | 2/2012 | Grossman | G06T 15/04 345/585 |

OTHER PUBLICATIONS

Giegl et al., "Unpopping: Solving the Image-Space Blend Problem for Smooth Discrete LOD Transitions", Cormuter Graphics Forum, vol. 26, No. 1, Mar. 2007, pp. 46-49.

Rohlf et al., "IRIS Performer: A High Performance Multiprocessing Toolkit for Real-Time 3D Graphics", In Proceedings of the 21st Annual Conference on Computer Graphics and Interactive Techniques (SIGGRAPH '94). ACM, New York, NY, USA, pp. 381-394.

Eckel. "IRIS Performer Programmer's Guide", 1995-1997, pp. 134-144.

Luebke et al. "Level of Details for 3D Graphics," Chapter 4, Section 4.4.1, pp. 114-116, 2003, San Francisco, CA.

Southern et al., "Creation and Control of Real-time Continuous Level of Detail on Programmable Graphics Hardware," In *Computer Graphics Forum*, vol. 22, No. 1, Blackwell Publishing, Inc., Mar. 2003, pp. 35-48.

* cited by examiner

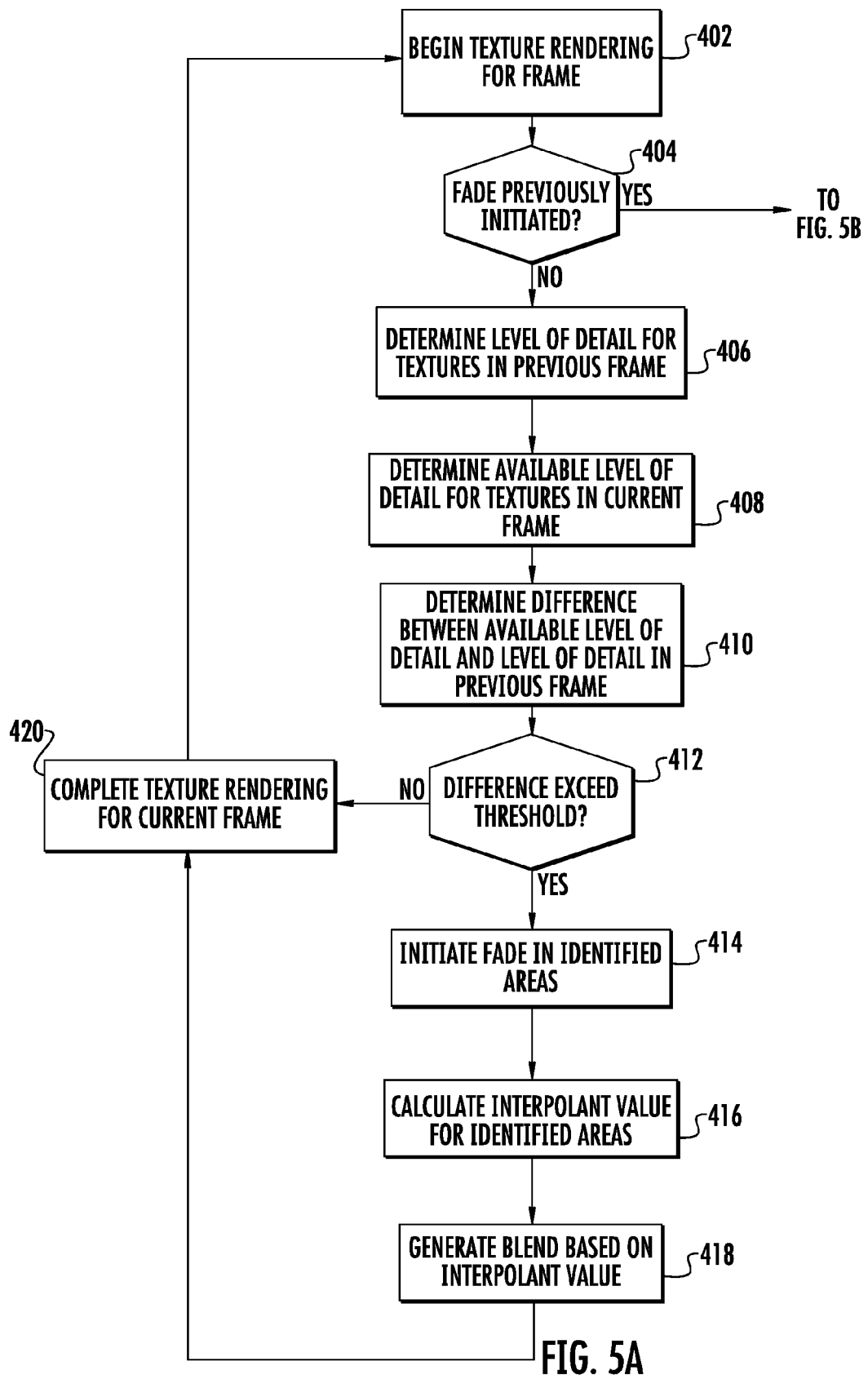

TEXTURE FADING FOR SMOOTH LEVEL OF DETAIL TRANSITIONS IN A GRAPHICS APPLICATION

PRIORITY CLAIM

This application claims priority to U.S. patent application Ser. No. 13/412,796 entitled "Texture Fading for Smooth Level of Detail Transitions in a Graphics Application," filed on Mar. 6, 2012 and U.S. Provisional Patent Application Ser. No. 61/590,546 entitled "Texture Fading for Smooth Level of Detail Transitions in a Graphics Application," filed on Jan. 25, 2012.

FIELD

The present disclosure relates generally to computer graphics and more particularly to rendering textures in imaging systems, such as geographic imaging systems.

BACKGROUND

Improvements in computer processing power and broadband technology have led to the development of interactive systems for navigating imagery, such as geographic imagery. Some interactive map navigation systems provide a user interface with navigation controls for navigating cities, neighborhoods, and other terrain in two or three dimensions. The navigation controls enable users to tilt, pan, rotate, zoom, and activate terrain and buildings for different perspectives at an area of interest. Exemplary map imaging systems include the Google Earth and Google Maps systems by Google Inc.

The imagery used by these interactive systems can be derived by rending geometric objects and texture objects to generate a two-dimensional or three-dimensional graphical representation of an area of interest. The geometric objects can define three-dimensional surfaces of objects and terrain depicted in the imagery. The texture objects can be mapped to the three-dimensional surfaces to add detail, surface texture, color and other features to the depicted objects and terrain.

Interactive systems for displaying imagery, such as geographic imagery, often render geometric and texture objects with low level of detail ("LOD") (e.g. low resolution) at camera views far from an area of interest to improve performance. As the user zooms in closer to the area of interest, geometric and texture objects with higher LOD (e.g. higher resolution) are rendered to depict objects in greater detail. Switching between two levels of detail can cause a distracting pop if the levels of detail are sufficiently different and/or the transition happens too close to the camera view. The pop can be a visual anomaly which disrupts the user's sense of immersion in the imagery. Moreover, if the geometric data and the texture data are fetched from a server over a network, the latency between the request for higher resolution objects and the receipt of the data by the client can be long. In this case, a user can zoom in past the natural resolution of a rendered scene, resulting in a blurry image. When the higher resolution imagery finally arrives from the server and is rendered, the higher resolution imagery will "pop" into view because its resolution is markedly different from the imagery in the previously displayed blurry image.

SUMMARY

Aspects and advantages of the invention will be set forth in part in the following description, or may be obvious from the description, or may be learned through practice of the invention.

One exemplary aspect of the present disclosure is directed to a computer-implemented method for rendering texture in a graphics application. The method includes displaying, in a user interface of a display device, a representation of a geographic area having texture rendered at a first level of detail. The texture can be based at least in part on map, satellite, or geographic imagery. The method further includes transitioning to a display of a representation of at least a portion of the geographic area having texture rendered at a second level of detail using a level of detail fade for the texture.

Another exemplary aspect of the present disclosure is directed a computer-implemented method for rendering texture in a graphics application. The method includes identifying a first level of detail for texture rendered in a first frame of a graphics application; identifying a second level of detail for texture in a second frame of the graphics application; and initiating a level of detail fade for portions of the frame where the second level of detail exceeds the first level of detail. The level of detail fade can include generating a blended texture from the texture at the first level of detail and the texture the second level of detail; and adjusting the blended texture over time pursuant to a fade rate to provide the transition between the first level of detail and the second level of detail.

Other exemplary implementations of the present disclosure are directed to systems, apparatus, computer-readable media, devices, and user interfaces for providing smooth level of detail transitions in graphical applications.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 5A and 5B depict a flow diagram of an exemplary method according to an exemplary embodiment of the present disclosure.

DETAILED DESCRIPTION

Figure 1:
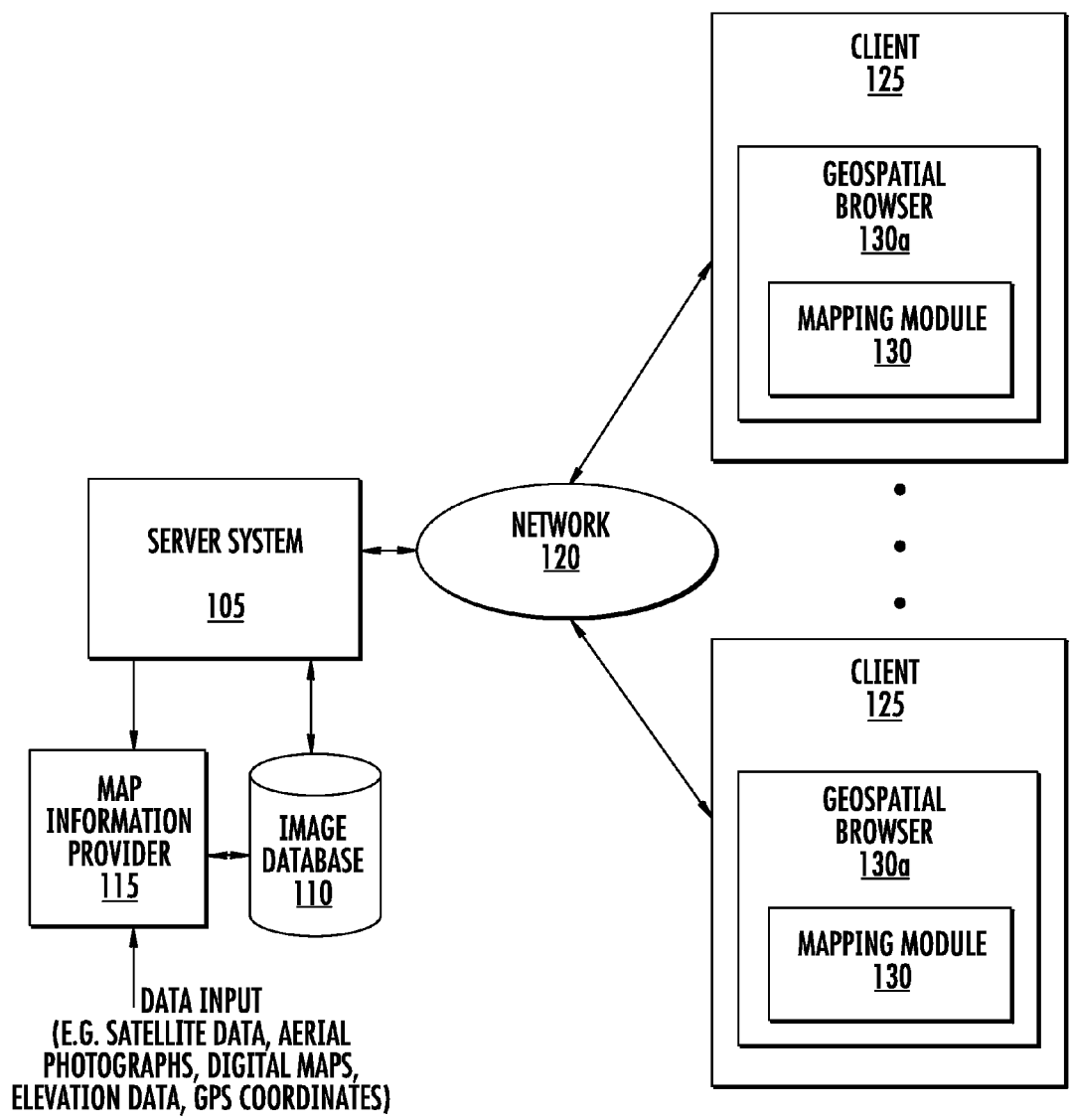
FIG. 1 depicts a computer-based system according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for providing a smooth level of detail ("LOD") transition for textures in a graphics application. For instance, the present disclosure is directed to providing a transition from texture rendered at a first LOD to texture rendered at a second LOD. The first LOD can be the LOD of the texture rendered in a previous frame of imagery. The second or new LOD can be the available LOD for rendering in a current frame of imagery.

As used herein, the available LOD refers to the LOD that is available to be rendered in a current frame. In many instances, the available LOD is the target LOD for a particular frame of imagery. The target LOD refers to the target or desired LOD for a current frame. In some cases, however, the available LOD and the target LOD may differ, for instance, if the target LOD has not yet been downloaded, received, or otherwise become available for rendering in the current frame.

In a particular implementation, the texture LOD rendered in a previous frame of imagery can be compared to the texture LOD which is available or desired to be rendered in a current frame. For areas where the available LOD is higher than the previous LOD, a temporal fade from the previous LOD to the new LOD can be performed to provide a smooth LOD transition to reduce the distracting visual "popping" of the higher resolution imagery into view. The LOD fade can be performed for textures rendered in the imagery independent of the LOD rendered for geometric objects in the imagery.

According to a particular aspect of the present disclosure, the LOD fade can be implemented by generating a blend of the previous LOD with the available LOD. As used herein, the term "blend" and "blended texture" can be used interchangeably and will refer to a texture with attributes of the texture at the previous LOD and attributes of the texture at the available LOD. Initially, the blend can primarily include attributes of textures at the previous LOD. For instance, the texture can be rendered such that a given region is rendered with 95% percent of the texture at the previous LOD and 5% of the texture at the available LOD. For example, the color at each pixel can be a blend of 95% at the previous LOD and 5% of the available LOD.

In subsequent frames, the blend can be adjusted to advance the transition between the previous LOD and the new LOD. In particular, the blended texture can be adjusted such that a greater percentage of the texture at the available LOD forms a part of the blend until the entire blend is rendered at the available LOD. This adjusting of the blend provides the temporal level of detail fade from the previous LOD to the available LOD. Using a blend between textures at the previous LOD and the second LOD allows for implementing the temporal fade without having to fetch textures at intermediate levels of detail, leading to faster processing times and reduced network traffic.

In one implementation, the blend is generated based on an interpolant value. The interpolant value can be calculated based on the difference between the previous LOD and the available LOD. The interpolant value can have a value between 0 and 1 and can specify the percentage of the blended texture attributable to the available LOD relative to the previous LOD. For instance, an interpolant value of 0.5 can be indicative of a 50%-50% blend of the available LOD versus the previous LOD. An interpolant value of 0.9 can be indicative of a 90%-10% blend of the available LOD versus the previous LOD.

According to another aspect of the present disclosure, the interpolant value can be adjusted over time to achieve a desired fade rate for the transition. The fade rate specifies the rate of transition between the first LOD and the second LOD across rendering frames of the graphical application. In a particular implementation, the fade rate is dependent on the difference between the first LOD and the second LOD, such that the transition time (i.e. time it takes for the transition between the first LOD and the second LOD) remains constant, regardless of the difference or number of levels between the first LOD and the second LOD. In this manner, the scene resolution time (i.e. time it takes to fully resolve a scene) remains relatively constant.

Exemplary embodiments of the present disclosure will now be discussed in detail. The present subject matter will be discussed with reference to graphics applications allowing a user to navigate geographic imagery, such as the applications associated with the Google Earth and Google Maps services provided by Google Inc., such as a geographic area that includes a portion of a globe, as well as other 3D and/or 2D imaging systems. Those of ordinary skill in the art, using the disclosures provided herein, should understand that the present disclosure is equally applicable to other suitable graphics applications.

FIG. 1 illustrates an exemplary computer-based system configured in accordance with an embodiment of the present invention. The system combines satellite imagery, photographs, maps and other geographic data, and Internet search capability so as to enable a user to view imagery of the planet (e.g. as a portion of a globe) and related geographic information (e.g., locales such as islands and cities; and points of interest such as local restaurants, hospitals, parks, hotels, and schools). The system further allows the user to conduct local searches, get travel directions to a location or between two locations. The user can virtually fly from space (e.g., some vantage point above the Earth) to and around an entered target address or location, such as his neighborhood or other area of interest. Results are displayed in a 3D view. The user can tilt and rotate the view to see 3D terrain and buildings. The user can also annotate maps, and/or enable data layers to show, for example, parks, schools, hospitals, airports, shopping, and other points of interest or locales. The user can also layer multiple searches, save results to folders, and share search results and maps with others. In addition, a data exchange format referred to herein as KML (Keyhole Markup Language) enables the user to share useful annotations and view thousands of data points created by other system users. An exemplary graphical user interface allowing the user to interact with the system will be discussed with reference to FIG. 2.

Referring to FIG. 1, the system includes a client-server architecture, where the server-side communicates with one or more clients 125 via a network 120. The server-side includes a server system 105, an image database 110, and a map information provider 115. On the client-side, each client 125 includes a mapping module 130 that operates as a geospatial browser 130a (or other suitable viewer), so as to provide the user with an interface to the system. In one embodiment, at least some of the mapping modules 130 of the clients 125 further include development modules that end-users can use to generate data files describing particular presentations of data. In addition, the system may further include one or more third-party content servers.

The server system 105 can be any computing device and can include a processor and a memory. The memory can store instructions which cause the processer to perform operations, such as the operations for providing smooth LOD transitions discussed herein. The server system 105 is in communication with the image database 110, which includes image data (e.g., digital maps, satellite images, aerial photographs, street-level photographs). Non-image data such as tabular data (e.g., digital yellow and white pages), and map layer data (e.g., database of diners, restaurants, museums, and/or schools; databases of seismic activity; database of national monuments; etc.) can also be stored in database 110 or in some other storage facility accessible to server system 105. The database 110 (and others, if applicable) is populated (e.g., offline or in real-time) by the server system 105.

The map information provider 115 provides server system 105 with map information (e.g., satellite data, street-level photographs, aerial photographs, digital maps, elevation data, longitude/latitude data, GPS coordinates). The provided map information can be collected, for example, as a function of the server system 105 (e.g., map information provider 115 is a database of map information collected by the server system 105). Alternatively, or in addition to, various third party map data services can be used to provide map information to server system 105. All such map internal/external information sources are generally represented by map information provider 115.

In any case, the server system 105 receives requests for map information, and responds to those requests, via the network 120. The map information provider 115 can also be further configured to respond directly to user requests for geographic data. In one embodiment, the server system 105 encodes the map information in one or more data files and provides the files to the requestor.

Note that other modules may be included in the system, and that illustrated modules may be rearranged. For instance, the database 110 can be integrated into the server system 105. Also, the map information provider 115 can be integrated into the server system 105. Other configurations will be apparent in light of this disclosure, and the present invention is not intended to be limited to any particular one. Any number of modules can be programmed or otherwise configured to carry out the server-side functionality described herein.

A client 125 on which the mapping module 130 runs can be, for example, a computing device having a processor and a memory, such as a desktop or laptop computer. Alternatively, a client 125 can be a wireless device, such as a personal digital assistant (PDA), smart phone, tablet, a navigation system located in a vehicle, a handheld GPS system, or other such devices/systems. In short, the client 125 can be any computer, device, or system that can execute the mapping module 130, and allows the user to interact with the server system 105 (e.g., requesting maps, driving directions, and/or data searches, and then receiving data files in response). In the embodiment shown, the mapping module 130 executes or otherwise runs as geospatial browser 130a.

The server system 105 can be implemented with conventional or custom technology. Numerous known server architectures and functionalities can be used to implement a GIS server. Further note that the server system 105 may include one or more servers operating under a load balancing scheme, with each server (or a combination of servers) configured to respond to and interact with clients via the network 120.

In general, when the user enters a search query (e.g., via the geospatial browser 130a presented by the client-side mapping module 130), it is put into a request and sent to the server system 105 via the network 120. The server system 105 then determines what the search query is for, and responds with the appropriate data from various sub-systems, such as geo-coders, routing engines, and local search indexes, in a format that the requesting client 125 can use to present the data to the user (e.g., via the geospatial browser 130a).

In addition to any conventional functionality, the server system 105 is further configured to interact with the mapping module 130, as will be apparent in light of this disclosure. In one embodiment, the server system 105 responds to the requesting client 125 by encoding data responsive to the request into one or more data files and providing the files to the client.

The network 120 may be any type of communications network, such as a local area network (e.g., intranet), wide area network (e.g., Internet), or some combination thereof. Alternatively, the network 120 may be a direct connection between a client 125 and the server system 105. In general, communication between the server system 105 and a client 125 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Used in conjunction with the server system 105, the geospatial browser 130a interface provided by the mapping module 130 provides a mapping system that serves maps and data over the network 120. The system allows users to visualize, select, annotate, and explore geographic information all over the world or in a particular region, city, town, or other locale.

Figure 2:
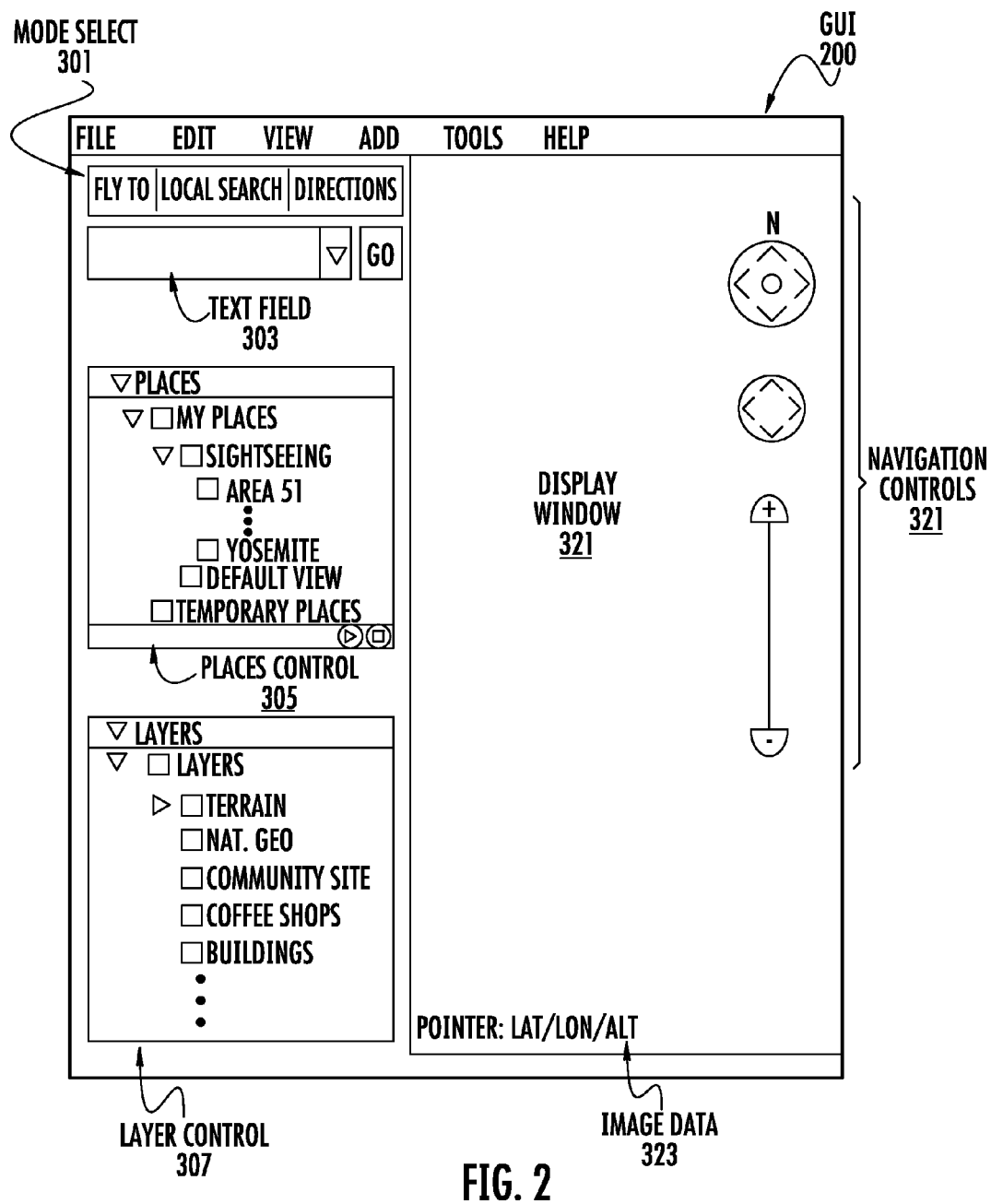
FIG. 2 depicts a graphical user interface for an interactive imaging system according to an exemplary embodiment of the present disclosure.

FIG. 2 illustrates one particular embodiment of a graphical user interface ("GUI") 200, which operates as a geospatial browser 130a for mapping module 130. The GUI includes a display window 321 for displaying 3D imagery, such as a portion of a globe, and a text input field 303 for entering location information such as latitude and longitude, an address and/or zip code, or the name of a well-known site (e.g., "Lincoln Memorial" or "Area 51"). The GUI 200 has a number of modes in which it can operate, including Fly To mode, Local Search mode, and Directions mode, as shown by mode select buttons 301. The GUI 200 also includes navigation controls 321 for adjusting the viewing altitude, adjusting the viewing angle, adjusting the view left and right, and adjusting the view to areas of the 3D imagery to the left, right, top or bottom of the display window.

The GUI 200 also includes places control 305, which allows the user to organize saved data in a Places panel in a way similar to how a user would organize files and folders on a computer's hard drive. The GUI 200 also includes layer control 307, which provides a variety of data points of geographic interest (e.g., points of interest, as well as map, road, terrain, and building data) that a user can select to display over the viewing area. In the embodiment shown in FIG. 2, example commonly used layers are available on the Layers panel. The GUI 200 of this example embodiment also displays image data 323 in the lower portion of the display window 321.

Numerous GUI configurations and underlying functionalities will be apparent in light of this disclosure, and the present invention is not intended to be limited to any one particular configuration. The displayed 3D maps can be manipulated using the GUI 201*a*. The GUI 200 can be used to reposition the current map view, for example, by clicking and dragging in the display window 321. A user may also select a geographical location by double-clicking on it within the display window 321.

Referring back to FIG. 1, the mapping module 130 associated the client device can include software that operates (in conjunction with server-side software) to provide geographic/geospatial images to a user's computer (or generally, client device) so they can be seen by the user or otherwise processed. In more detail, and in accordance with one particular embodiment, the mapping module 130 includes a user interface module, in which a motion model in the user's client is used to adjust the client's virtual viewing position and orientation relative to the visual environment of the system. The motion model also determines a view specification which defines the client's viewable volume within a three-dimensional space (this viewable volume is known as a frustum and herein referred to as the user's visual environment), and the position and orientation of the frustum, herein referred to as the virtual camera viewpoint, with respect to a three-dimensional map. Once a visual specification is determined, it is placed in the memory.

The view specification is read from the memory by a renderer, which is a software tool that draws or "renders" drawable data. The renderer can be configured to repeat a processing cycle, which includes: (1) reading the view specification in memory, (2) traversing a data structure in memory, (e.g. a quad node tree data structure, in which each quad node of the tree contains drawable data), and (3) drawing the drawable data contained in the data structure.

One exemplary data structure includes a quad node tree data structure in which each quad node has a payload of data and references to other files (e.g. four), each of which may be other quad nodes. When the renderer traverses the quad node tree, it first reads the payload of data in a parent quad node. If the payload is drawable data, the renderer will compare a bounding box (a volume that contains the data) of the payload, if present, to the view specification. If the bounding box is completely disjoint from the view specification, the data will not be drawn, despite the fact that the quad node has already been downloaded from a remote server.

If the payload is considered appropriate to draw, the renderer will attempt to access each of the references of the quad node. If the reference contains an address to a file in local memory, the renderer will go to that child quad node and read the payload, repeating the process for each subsequent child quad node until it encounters a quad node with a payload that has a bounding box completely disjoint from the view specification. If the reference does not contain an address in the local memory (i.e., the referenced file does not exist in the local memory), the renderer cannot access the file, and will continue to move down the quad node tree without trying to obtain the file. In this embodiment, the renderer only reads from the quad node tree, and does not provide coordinate and resolution information to any other object.

The quad node itself can have a built-in accessor function. When the renderer attempts to access a reference that has a filename, but no corresponding local address, this triggers the accessor function of the quad node to independently place its own address and the child reference number onto a cache node retrieval list, which comprises a list of information identifying files to be downloaded from remotes servers. A network loader in an independent network loader thread reviews the cache node retrieval list and requests only the files referenced on the list.

A cache node manager in an independent cache node manager thread allocates space in local memory and organizes files retrieved by the network loader into new quad nodes. The cache node manager also updates the parent quad nodes with the local memory address of these new child quad nodes. Therefore, on subsequent cycles of the renderer module, there will be additional quad nodes in local memory for the renderer to access. As in previous cycles, the renderer will look at the payload and draw all drawable data that does not fall completely outside the view specification. The renderer thread will continue this cycle until it reaches a quad node with a payload that has a bounding box completely disjoint from the view specification, or is otherwise inappropriate to draw. Thus, the renderer only draws what is already downloaded, and it only stops drawing when it encounters already downloaded data that has a bounding box completely disjoint from the view specification.

In accordance with one aspect of the present disclosure, the data structure can specify imagery data to be rendered in the form of both geometric objects and texture objects. Geometric objects can include information used to render three-dimensional objects and terrain in the geospatial view provided at the client device. Texture data can be used to render details, colors, textures, labels, and other features on the surfaces of the three-dimensional objects. The texture objects can be based on digital maps, satellite images, aerial photographs, street-level photographs and other imagery stored at the server. For instance, the geographic terrain of an area of interest can provide the basis for geometric objects for the area of interest while satellite imagery can be used to render texture objects on the surface of the geographic terrain.

Figure 3:
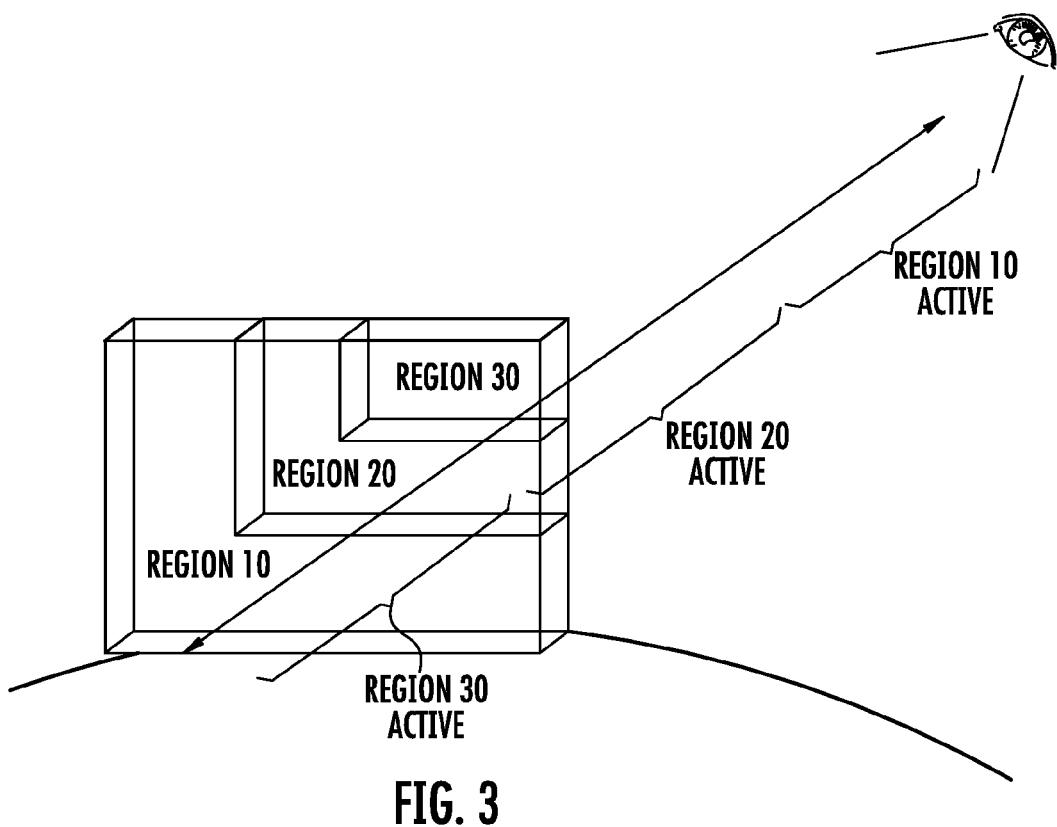
FIG. 3 depicts a conceptual diagram of the use of level of detail in various regions. In particular, region 10 has a higher LOD than region 20. Region 20 has a higher LOD than region 30.

The geometric objects and the texture objects can have varying levels of detail (LOD) based on the user's viewpoint relative to the area of interest. For instance, FIG. 3 provides a conceptual illustration of the use of (LOD) in differing regions. The LOD can be associated with the geometric objects and texture objects to control the activation of the objects based on LOD of the visual environment. The regions 10, 20, and 30 in FIG. 3 can be used to specify LOD specifications associated with data objects, such as texture objects, of increasingly finer levels of detail. The regions can have similar amounts of geometry and texture, but higher LOD regions can cover a smaller area.

Each region 10, 20, and 30 corresponds to a range of LOD values that specifying increasingly smaller projected pixel sizes for the drawn objects. The higher LOD regions are smaller and consequently project to smaller pixel areas on the display for the given viewpoint. As the user's viewpoint (e.g. virtual camera viewpoint) moves closer, the pixel size of the projected LOD increases, causing regions with large LOD values denoting higher resolution objects to become active because the data objects take up more screen space. The regions with finer LOD replace the previously loaded regions with courser resolution and are rendered in the visual environment relative to the virtual camera viewpoint. Accordingly, the geometric objects and the texture objects can be separated into distinct LOD levels so that different objects are displayed as the user explores a given area from different virtual camera viewpoints.

The LOD level associated with the geometric objects and texture objects for a rendered scene can be specified as an LOD value, for instance, in the range of 1-20. The higher the LOD value, the higher the LOD associated with the object. For instance, an object with an LOD value of 15 has greater LOD than an object with an LOD of 10. While LOD values in the range between 1-20 are used for discussion purposes, those of ordinary skill in the art, using the disclosures provided herein, should understand that any metric or range of for comparing LOD between objects can be used without deviating from the scope of the present disclosure.

Figure 4:
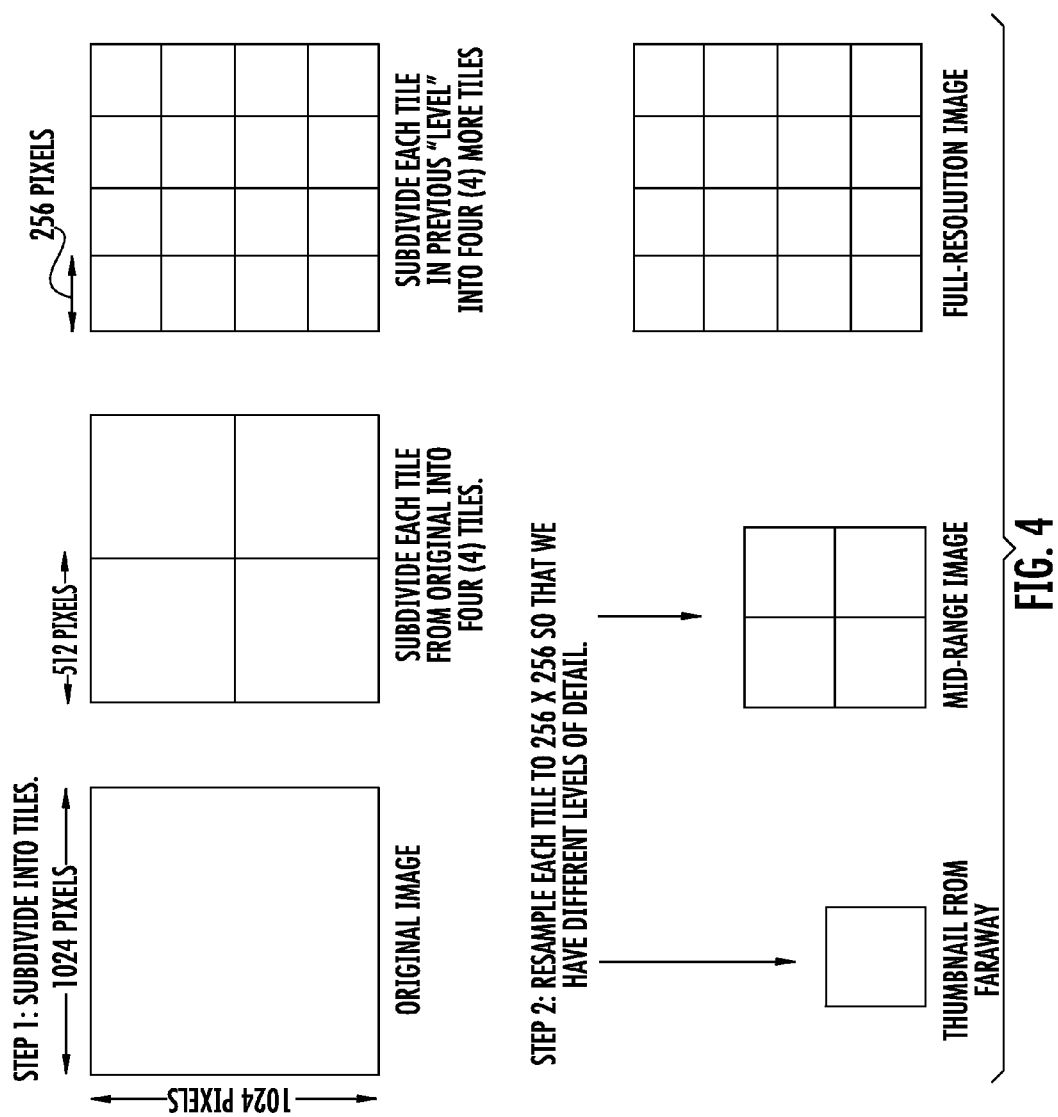
FIG. 4 depicts a hierarchy of object tiles of increasingly finer resolution according to an exemplary embodiment of the present disclosure.

According to particular aspects of the present disclosure, geometric objects and texture objects can be provided as object tiles to provide a hierarchy of image data with increasing levels of detail. FIG. 4 illustrates a use of regions to create a three-level hierarchy of data object tiles for faster loading of data. In Step 1, images of different levels of resolution are subdivided into a series of sub-images or "tile" data objects. In this example, three different copies of an image with a high level of detail (1024 pixels) are divided into a different number of tiles (1, 4 and 16) representing different levels of detail. In Step 2, the resolution of each set of tiles is re-sampled such that each tile has the same number of pixels, in this example 256×256 pixels. The sets of tiles derived from the three different images are used to define regions at different levels of detail. In particular, each level of imagery is 2× the resolution of the previous level.

Each set of images can contain a set of links to child data objects of finer resolution. Using the example in FIG. 4, the single thumbnail image can contain links to each of the four mid-range images prompting the files for the mid-range images to be retrieved when the thumbnail becomes active. The mid-range images can then be evaluated and activated based on their LOD specifications. Likewise, each mid-range image can contain links to four files of the full-resolution images.

Figure 5B:
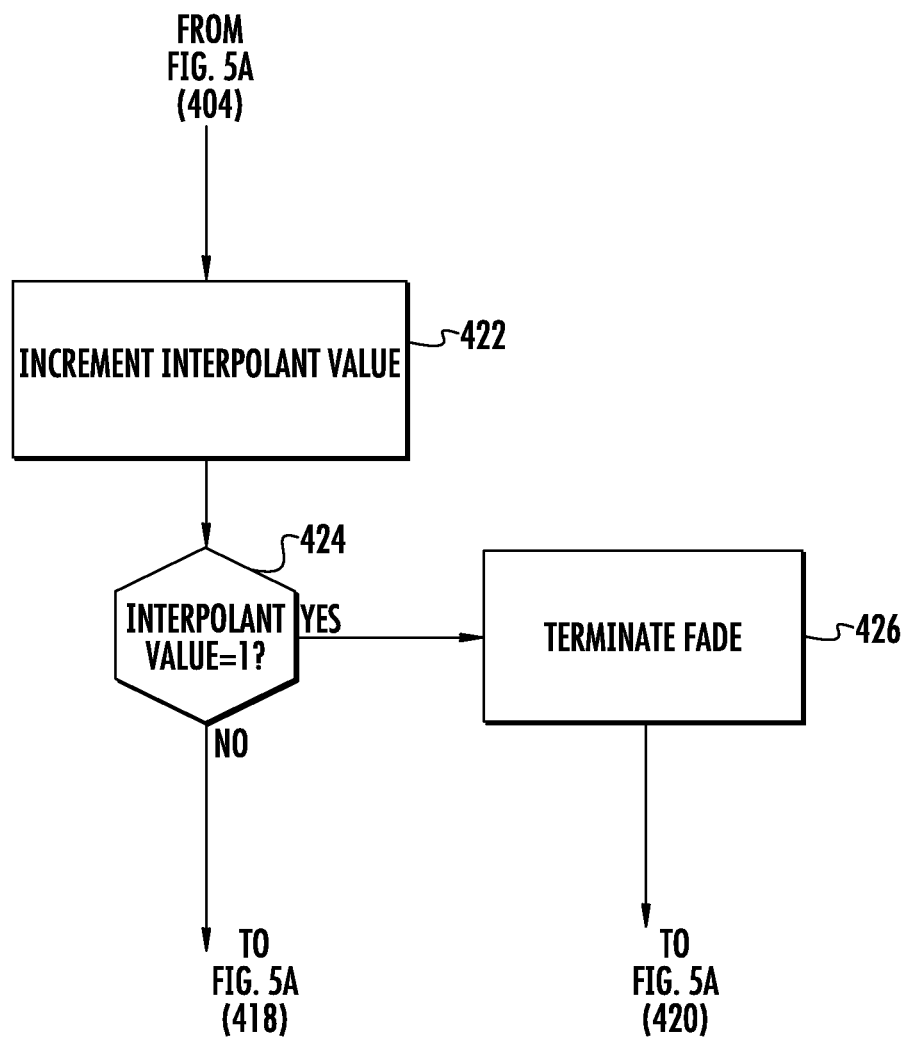

As discussed above, it can be desirable to manage the transition between levels of detail for texture objects rendered in a scene to avoid the appearance of higher resolution imagery "popping" into view. FIGS. 5A and 5B depict an exemplary method 400 for managing the LOD transition for texture objects according to an exemplary aspect of the present disclosure. The method can be executed on a suitable computing device having a processor and a memory, such as any of the computing devices depicted in FIG. 1. In addition, although FIGS. 5A and 5B depict steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

At (402), the method begins texture rendering for a frame. A frame refers to an individual rendered output image displayed in the graphics application. The output images can be rendered at a specified frame rate (e.g. output images per second) to attain a desired processing rate as is useful in a computer graphics applications. In accordance with aspects of the present disclosure, the steps of the method can be performed during the rendering of each new frame to ensure a smooth LOD transition between frames.

At (404), the method determines whether a texture LOD fade for portions of the imagery depicted in the frame has already been initiated. If so, the method proceeds to (422) of FIG. 5B to continue the texture LOD fade across frames as will be discussed in detail below. Otherwise, the method continues to (406) where the method determines the level of detail for textures in a previous frame. The LOD information for the previous frame can be retrieved from a memory and can include an LOD value, such as an LOD value in the range of 1-20. For instance, the method can determine, based on historical data stored in memory associated with the graphics application, that the previous frame included textures having an LOD value of 10.

At (408), the method determines the available LOD for textures in the current frame. The available LOD refers to the LOD that is available to be rendered in a current frame. In many instances, the available LOD is the target LOD for a particular frame of imagery. In some cases, however, the available LOD and the target LOD may differ, for instance, if the target LOD has not yet been downloaded, received, or otherwise become available. In these cases, the available LOD may change during the LOD fade as new textures become available. The available LOD information can be determined from a data structure associated with the memory for a particular desired view of the imagery in the graphics application. For instance, the method can determine that at the particular camera view for the current frame, texture objects having an LOD value of 15 are available.

At (410), the method determines the difference between the available LOD in the current frame and the LOD in the previous frame. In the example discussed above, the difference in texture LOD level of 10 for the previous frame and the available texture LOD of 15 for the current frame is 5. At (412), the method can determine whether this difference exceeds a predefined threshold. The threshold can be set such that a texture LOD fade will be initiated only if a noticeable jump in LOD is required between frames. For instance, the threshold can be set such that an LOD fade will be initiated if the difference in the available texture LOD for the current frame and the LOD for the previous frame is two or more.

If the difference between LOD values does not exceed the threshold, the method can continue texture rendering for the current frame without initiating an LOD fade (420). The method then begins rendering texture in subsequent frames (402) where the method 400 is repeated to ensure smooth LOD transitions between frames.

If the difference between LOD values does exceed the threshold. An LOD fade can be initiated for identified areas in the imagery where the available LOD exceeds the previous LOD by the threshold (414). The texture LOD fade provides for a smooth transition between the frames to prevent the "popping" of higher resolution imagery into view. The texture LOD fade can be performed independent of the LOD for geometric objects rendered in the scene.

As discussed below, the LOD fade provides for the gradual blending between textures at the previous LOD and at the available LOD across subsequent frames pursuant to an LOD fade rate to achieve a desired transition effect for the fade. According to a particular embodiment, the LOD fade rate is variable based on the difference between the previous LOD and the second LOD such that the transition time between for a complete LOD fade from the previous LOD to the second LOD is constant. In addition, processing time for the fade is improved relative to certain known LOD fade techniques because the LOD fade does not require the fetching of texture objects at LOD levels intermediate the previous LOD and the available LOD.

In the particular implementation shown in FIG. 5A, the LOD fade can include determining an interpolant value for the LOD fade. As will be discussed in more detail below, the interpolant value for the LOD will control the ratio of the blend of textures between the previous LOD and the available LOD. The interpolant value can have a value between 0 and 1.

The interpolant value can be calculated for the frame based on the difference between the available LOD when the LOD fade was initiated and the previous LOD. For instance, the interpolant value t can be calculated pursuant to the following:

$$t=(\text{TextureFadeLOD}-\text{StartLOD})/(\text{AvailLOD}-\text{StartLOD})$$

where StartLOD is representative of the texture LOD of the frame prior to the initiation of the LOD fade; AvailLOD is representative of the available texture LOD for the frame in which the LOD fade was initiated; and TextureFadeLOD is calculated based on the following:

$$\text{TextureFadeLOD}=\text{Previous TextureFadeLOD}+\text{fade rate}*(\text{AvailLOD}-\text{StartLOD})$$

where Previous TextureFadeLOD is the TextureFadeLOD for the previous frame. PreviousTextureFade LOD is initialized as the StartLOD value. The fade rate is a predefined rate that can be based on the frame rate or other rate associated with the graphics application. For instance, the fade rate can be based on a rate independent of the frame rate to improve transition between frames.

By way of example, if the texture LOD of the previous frame is 10 and the available LOD of the current frame is 15, the interpolant value can be calculated as follows. The TextureFadeLOD is initially determined to be (10+fade rate*(15−10)) or 10+5*fade rate. Assuming a fade rate of 0.1 LOD levels per frame, the initial TextureFadeLOD value is 10.5. The interpolant value t can then be calculated to be t=(10.5−10)/(15−10)=0.1.

In cases where the available LOD is not equal to the target LOD for a particular view, the interpolant value t can be calculated for the frame as follows:

$$t=(\text{TextureFadeLOD}-\text{StartLOD})/(\text{AvailLOD}-\text{StartLOD})$$

where StartLOD is representative of the texture LOD of the frame prior to the initiation of the LOD fade; AvailLOD is representative of the available texture LOD for the frame; and TextureFadeLOD is calculated based on the following:

$$\text{TextureFadeLOD}=\text{Previous TextureFadeLOD}+\text{fade rate}*(\text{TargetLOD}-\text{StartLOD})$$

where Previous TextureFadeLOD is the TextureFadeLOD for the previous frame. PreviousTextureFade LOD is initialized as the StartLOD value. TargetLOD is the target LOD for the view associated with fame. The fade rate is a predefined rate that can be based on the frame rate or other rate associated with the graphics application. For instance, the fade rate can be based on a rate independent of the frame rate to improve transition between frames.

By way of example, if the texture LOD of the previous frame is 10, the available LOD of the current frame is 12, and the target LOD of the frame is 15, the interpolant value can be calculated as follows. The TextureFadeLOD is initially determined to be (10+fade rate*(15−10)) or 10+5*fade rate. Assuming a fade rate of 0.1 LOD levels per frame, the initial TextureFadeLOD value is 10.5. The interpolant value t can then be calculated to be t=(10.5−10)/(12−10)=0.25. The blend for this interpolant value would include attributes attributable to 25% at the available LOD and 75% at the previous LOD.

At (418), the method includes generating a blend of textures based on the interpolant value. The blend of textures can be a blended texture where attributes, such as color, of the blended texture include a blend of the available LOD texture and the previous LOD texture. Many techniques can be used to generate the blended texture. For instance, pixel values associated with the blended texture can be determined by interpolating pixel values associated with available LOD texture and pixel values associated with the previous LOD texture.

The interpolant value specifies the blend ratio between the texture objects at the previous LOD and the current LOD. For instance, an interpolant value of 0.1 can specify that the texture objects include a blend of about 10% available LOD texture and 90% previous LOD texture. Similarly, an interpolant value of 0.95 can specify that the texture objects include a blend of about 95% available LOD texture and 5% previous LOD texture.

As will be further discussed in detail below, the method includes adjusting the interpolant value over time to implement the LOD fade. In particular, the interpolant value can be incremented based on the fade rate in subsequent frames. In this manner, the blend of textures will continuously be adjusted based on the incrementing interpolant value such that a greater portion of the blend is attributable to higher available LOD during the LOD fade. This causes a smooth transition between different LOD levels across multiple frames.

For instance, at (420) the method includes completing the texture rendering for the current frame, after which the method returns to (402) for the subsequent frame. At (404), the method determines that a LOD fade has previously been initiated. Referring to FIG. 5B at (422), the method increments the interpolant value for the LOD fade. The interpolant value can be incremented based on the fade rate for LOD fade.

In particular, referring to the above example in which the Available LOD is equal to the Target LOD, the interpolant value is incremented as demonstrated in the following example. The method determines a new TextureFadeLOD value based on the following:

$$\text{TextureFadeLOD}=\text{Previous TextureFadeLOD}+\text{fade rate}*(\text{AvailLOD}-\text{StartLOD}).$$

In the above example, the TextureFadeLOD is determined to be (10.5+fade rate*(15−10). Assuming a fade rate of 0.1 LOD per frame, the TextureFadeLOD is calculated to be (10.5+0.1*(15−10)=11.0. The interpolant value can then be calculated as (11−10)/(15−10) or 0.2.

In the example where the Available LOD and the Target LOD are not identical at the beginning of the fade, but the Target LOD subsequently becomes the Available LOD the calculation of the interpolant value t would then be (10.5+ fade rate*(15−10)) or 10.5+5*fade rate. Assuming a fade rate of 0.1 LOD levels per frame, the TextureFadeLOD value is calculated to be 11.0. The interpolant value is calculated as follows: t=(11−10)/(15−10)=0.2. In this example, the blended texture would include a blend of about 20% available LOD texture and 90% previous LOD texture.

The fade rate for the LOD fade can be set such that the total transition time for the fade remains constant regardless of the number of levels between the previous LOD and the second LOD. For example, if a large number of levels exist between the previous LOD and the second LOD, the frame rate will be dynamically increased such that the transition from the previous LOD to the available LOD occurs at a rate substantially equal to the fade rate for a transition between closer LOD values. In this manner, the scene resolution time to achieve a fully resolved scene remains constant.

At (424), the method determines if the incremented interpolant value is equal to 1. If not, the method generates a texture blend based on the incremented interpolant value as shown at (418) of FIG. 5A. For example, the percentage of available LOD texture in the blend can be increased from about 10% to about 20%. The method completes the texturing rendering (420) and begins texture rendering for the next frame (402) where the method can repeat itself until the incremented interpolant value is equal to or greater than 1. Once the interpolant value is equal to 1, the LOD fade should be complete. At this point, the method terminates the LOD fade (426) and completes the texture rendering for the current frame (420). The texture will be rendered at the available LOD determined when the LOD fade was initiated.

Various features can be implemented along with the LOD fade to improve the visual experience of the user. For instance, in one example, the method can detect regions associated with edge of the particular view. The method can be configured such that an LOD fade is not initiated at the edge of the particular view as the user pans the view to avoid fading each tile as it comes into view.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for rendering texture in a graphics application, comprising:
   identifying, by one or more computing devices, a first level of detail associated with texture rendered in a first frame of a graphics application;
   identifying, by the one or more computing devices, a second level of detail associated with texture in a second frame of the graphics application; and
   initiating, by the one or more computing devices, a temporal level of detail fade to transition between the first level of detail and the second level of detail, the temporal level of detail fade comprising the operations of:
      generating, by the one or more computing devices, a blended texture from the texture associated with the first level of detail and the texture associated with the second level of detail; and
      adjusting, by the one or more computing devices, the blended texture over time pursuant to a fade rate to transition between the first level of detail and the second level of detail, the fade rate specifying a rate of transition between the first level of detail and the second level of detail;
   wherein the fade rate for the transition is dependent on a magnitude of a difference between the first level of detail and the second level of detail such that a constant transition time is provided regardless of the difference or number of levels between the first level of detail and the second level of detail.

2. The computer-implemented method of claim 1, wherein adjusting, by the one or more computing devices, the blended texture over time comprises:
   adjusting, by the one or more computing devices, an interpolant value based at least in part on the fade rate for the temporal level of detail fade, the interpolant value specifying a blend ratio for the blended texture; and
   adjusting, by the one or more computing devices, the blended texture based on the adjusted interpolant value.

3. The computer-implemented method of claim 1, wherein the first and second level of detail for the texture correspond to different zoom levels for the graphics application.

4. The computer-implemented method of claim 1, wherein the temporal level of detail fade is performed independent of a level of detail associated with geometric objects rendered in the graphics application.

5. The computer-implemented method of claim 1, wherein the graphics application is associated with a representation of a geographic area.

6. A computing system comprising one or more processors and one or more computer-readable media, the one or more computer-readable media storing computer readable instructions that when executed by the one or more processors cause the one or more processors to perform operations, the operations comprising:
   identifying a first level of detail associated with texture rendered in a first frame of a graphics application;
   identifying a second level of detail associated with texture in a second frame of the graphics application; and
   initiating a temporal level of detail fade to transition between the first level of detail and the second level of detail, the temporal level of detail fade comprising the operations of:
      generating a blended texture from the texture associated with the first level of detail and the texture associated with the second level of detail; and
      adjusting the blended texture over time pursuant to a fade rate to transition between the first level of detail and the second level of detail, the fade rate specifying a rate of transition between the first level of detail and the second level of detail;
   wherein the fade rate for the transition is dependent on a magnitude of a difference between the first level of detail and the second level of detail such that a constant transition time is provided regardless of the difference or number of levels between the first level of detail and the second level of detail.

7. The computing system of claim 6, wherein the operation of adjusting the blended texture over time comprises:
   adjusting an interpolant value based at least in part on the fade rate for the temporal level of detail fade, the interpolant value specifying a blend ratio for the blended texture; and
   adjusting the blended texture based on the adjusted interpolant value.

8. The computing system of claim 6, wherein the first and second level of detail for the texture correspond to different zoom levels for the graphics application.

9. The computing system of claim 6, wherein the temporal level of detail fade is performed independent of a level of detail associated with geometric objects rendered in the graphics application.

10. The computing system of claim 6, wherein the graphics application is associated with a representation of a geographic area.

11. One or more tangible, non-transitory computer readable media storing computer-readable instructions that when executed by one or more processors cause the one or more processors to perform operations, the operations comprising:
   identifying a first level of detail associated with texture rendered in a first frame of a graphics application;
   identifying a second level of detail associated with texture in a second frame of the graphics application; and initiating a temporal level of detail fade to transition between the first level of detail and the second level of detail, the temporal level of detail fade comprising the operations of:
  generating a blended texture from the texture associated with the first level of detail and the texture associated with the second level of detail; and
  adjusting the blended texture over time pursuant to a fade rate to transition between the first level of detail and the second level of detail, the fade rate specifying a rate of transition between the first level of detail and the second level of detail;
wherein the fade rate for the transition is dependent on a magnitude of a difference between the first level of detail and the second level of detail such that a constant transition time is provided regardless of the difference or number of levels between the first level of detail and the second level of detail.

12. The one or more tangible, non-transitory computer readable of claim 11, wherein the operation of adjusting the blended texture over time comprises:

adjusting an interpolant value based at least in part on the fade rate for the temporal level of detail fade, the interpolant value specifying a blend ratio for the blended texture; and adjusting the blended texture based on the adjusted interpolant value.

13. The one or more tangible, non-transitory computer readable of claim 11, wherein the first and second level of detail for the texture correspond to different zoom levels for the graphics application.

14. The one or more tangible, non-transitory computer readable of claim 11, wherein the temporal level of detail fade is performed independent of a level of detail associated with geometric objects rendered in the graphics application.

15. The one or more tangible, non-transitory computer readable of claim 11, wherein the graphics application is associated with a representation of a geographic area.

\* \* \* \* \*